United States Patent [19]
Domae et al.

[11] Patent Number: 6,088,004
[45] Date of Patent: Jul. 11, 2000

[54] IMAGE DISPLAY SYSTEM FOR BOWLING LANES

[75] Inventors: Yoshinobu Domae; Kozo Morooka, both of Osaka; Norihumi Goto, Kyoto, all of Japan

[73] Assignee: Daifuku Co., Ltd., Japan

[21] Appl. No.: 08/977,399

[22] Filed: Nov. 24, 1997

[30] Foreign Application Priority Data

Nov. 25, 1996 [JP] Japan .................................. 8-330267

[51] Int. Cl.[7] .................................................. G09G 5/00
[52] U.S. Cl. .................................. 345/1; 345/2; 345/56; 473/54; 473/65
[58] Field of Search ............................. 345/1, 2, 15, 56; D/233; 40/902, 901; 116/222; 473/54, 65, 70, 71, 73

[56] References Cited

U.S. PATENT DOCUMENTS

| | | | |
|---|---|---|---|
| 5,411,442 | 5/1995 | Stephens et al. | 473/54 |
| 5,557,868 | 9/1996 | Tabary et al. | 40/471 |
| 5,628,693 | 5/1997 | Mowers et al. | 473/86 |
| 5,779,554 | 7/1998 | Sanders et al. | 473/54 |

*Primary Examiner*—Vijay Shankar
*Assistant Examiner*—Mansour M. Said
*Attorney, Agent, or Firm*—Morrison Law Firm

[57] ABSTRACT

An image display system displays images on a plurality of masked monitors, overhead monitors, or both. Images from a plurality of image sources are selected by a controller for display on the monitors. The controller can split up the image so that one image can be displayed on a plurality of monitors, or can be spread over a plurality of monitors. A plurality of sub-computers provide another source of data to the overhead monitors. The sub-computers receive data from a game information source and a host computer which they can output for display on the over-head monitors.

19 Claims, 4 Drawing Sheets

IMAGE DISPLAY SYSTEM FOR BOWLING LANES

BACKGROUND OF THE INVENTION

The present invention relates to an image display system for bowling lanes. In particular, the present invention relates to an image display system for bowling lanes that provides a decorative effect through the simple display of different images using a variety of display patterns, with the displayed images capable of including information in addition to player information (e.g. the names of players) and games information (e.g. scores).

Referring to FIG. 4, there is shown a conventional bowling lane. A plurality of masking panels 51 displaying pictures or designs is disposed continuously across lanes 61 in front of a pin-setting machine (not shown in the drawing) at the front of lanes 61. Masking panels 51 serve both to hide the pin setting machine and to provide a decorative effect. Masking panels 51 are generally separately provided for each lane 61. A prescribed picture or design can be displayed individually on each masking panel 51 or can be displayed continuously across a plurality of masking panels 51.

Pictures and designs are generally permanently affixed on masking panels 51 using paint or the like. Different pictures or designs can be painted on the front and the back of the panels. This allows the pictures to be changed by flipping over the panels at desired intervals. Alternatively, the displayed pictures can be changed by replacing the panels with separate panels on which are painted different pictures or designs.

In recent bowling lanes, a host computer (not shown) is installed at the front desk. Sub-computers 52 connected to the host computer are installed in waiting spaces 62. Waiting spaces 62 are provided for each lane 61 for the players to wait during a game. In front of and above waiting space 62, an over-head monitor 53 connected to sub-computer 52 is installed for each lane 61.

Player information, such as the name of the players, is entered into the host computer when players register at the front desk. This player information is sent from the host computer to sub-computer 52, and the player information is displayed on over-head monitor 53 along with game information such as game scores.

Sub-computer 52 includes a data entry keyboard 52a and an auxiliary display 52b displaying the same image as over-head monitor 53. If there is a change in the players during the game, the players themselves can change the information directly with reference to auxiliary display 52b and typing on keyboard 52a.

As described above, masking panels 51 disposed at the front of lanes 61 only display permanent pictures and designs. Thus, no dynamic changes in the display contents or the display state is possible, and the same pictures or designs are displayed until the panels are replaced. This provides an inadequate decorative effect, and the replacement of panels requires extra work.

If, for example, a bowling competition is to be held using a plurality of lanes 61, it is not possible to easily display a message such as "XXth ANNUAL YYY BOWLING COMPETITION" only on the masking panels 51 at the front of the lanes 61 being used for the competition. In any case, masking panels 51 are limited in their ability to display images.

Over-head monitors 53 only display individual player information and game information (e.g. game scores for the lanes being used). Thus, there is not much variation in the display on over-head monitors 53, and over-head monitors 53 are not being used efficiently.

As described above, in player waiting space 62 is installed sub-computer 52, which comprises auxiliary display 52b displaying the same information as over-head monitor 53 and allowing players to make changes in the data. The presence of sub-computer 52 prevents the efficient utilization of player waiting space 62.

OBJECTS AND SUMMARY OF THE INVENTION

A first object of the present invention is to provide an image display system for bowling lanes that has powerful image displaying capabilities and that offers a superior decorative effect.

A second object of the present invention is to provide an image display system for bowling lanes that allows data to be changed without requiring installation of a sub-computer for data entry in the player waiting space, thus allowing efficient usage of the player waiting space.

In order to achieve the first object, the present invention provides an image display system for bowling lanes comprising: a plurality of masking monitors disposed in front of a pin setting machine at the front of the lanes, separated for each lane, and continuously disposed across the lanes; means for controlling multiple screens receiving an image signal from an image source and displaying the image to the plurality of masking monitors; and means for entering masking monitor settings for providing settings for the masking monitors used for multi-screen displays.

In an image display system for bowling lanes having the above structure, a plurality of continuously disposed masking monitors can dynamically display images as single frames. Various different images can be easily displayed simply be changing the image source.

An alternative image display system comprises: a plurality of over-head monitors disposed continuously across the lanes, separated by lane, and positioned in front of and above a waiting space for players to wait during a game; a plurality of sub-computers disposed for each lane receiving game information signals from various data sources and player information signals from a host computer installed at the front desk, and displaying the player information and the game information on the over-head monitor of the corresponding lane; means for controlling multi-screen displays receiving an image signal from an image source and dividing and displaying the image to the plurality of over-head monitors; means for selecting signals selecting between an output signal from the sub-computer and the output signal from the multi-screen display controlling means, and outputting the selected signal to the over-head monitor; and means for entering over-head monitor settings providing settings to the over-head monitors used in multi-screen displaying. This structure not only allows the corresponding over-head monitor to display player information and game information but also allows single-frame images to be displayed dynamically over a continuous plurality of over-head monitors. Also, various different images can be displayed easily by simply changing the image source.

The two image display systems described above can be combined so that similar image displays can be performed on both the masking monitors and the over-head monitors, thus allowing variations in the display.

Also, in order to achieve the second object described above, the present invention provides an image display system comprising means for entering changes allowing players to enter changes into the data on the host computer using the sub-computer. This change entering means comprises: a receiving station disposed near the over-head monitors; and a transmitting remote control providing wireless transmission of change entry data to the receiving station.

This allows players to enter changes easily by operating the remote control transmitter while watching the over-head monitor. Thus, there is no need as in the conventional technology to use the player waiting space for installation of a sub-computer comprising an auxiliary display showing the same display as the over-head monitor.

Of course, in an image display system that seeks to achieve only the first objective, a change-entry sub-computer comprising the auxiliary display can be installed in the player waiting space, as in the conventional technology.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
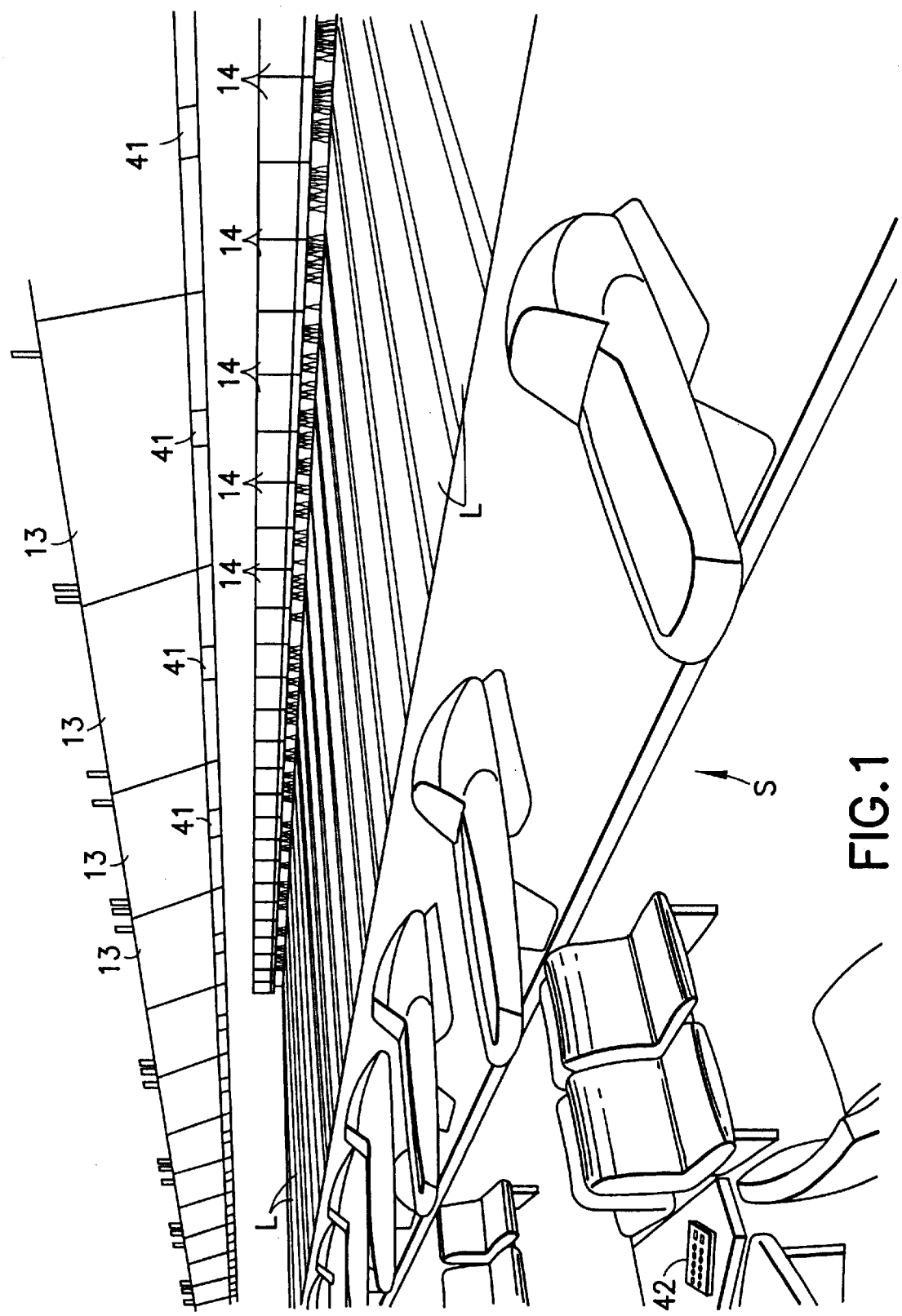
FIG. 1 is a perspective drawing showing a bowling lane according to an embodiment of the present invention.
Figure 2:
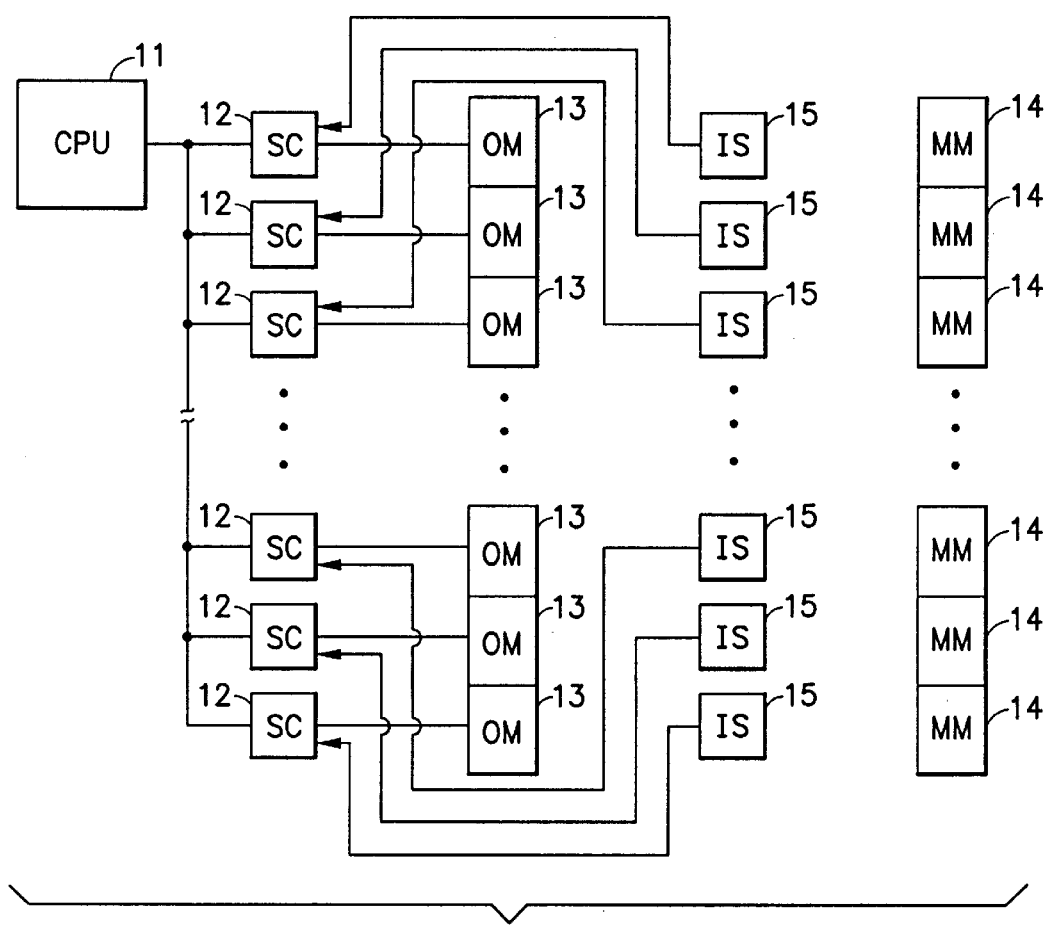
FIG. 2 is a block diagram showing the management system for the bowling lane in FIG. 1.

Referring to the drawings, the following is a description of the embodiments of the present invention. Referring to FIG. 1 and FIG. 2, a host computer 11 is installed at the front desk. Host computer 11 manages the various data relating to the operation of the entire bowling lane.

Host computer 11 is connected to a plurality of sub-computers 12 installed in lanes L. Data sources 15 are connected to sub-computer 12. Data sources 15 provide various data relating to a game and can include: image processing devices performing image processing on signals from video cameras capturing pin arrangement positions and detecting whether or not pins are standing at the pin arrangement positions; video cameras capturing the bowling form of the players; and the like. Sub-computer 12 receives data signals from data sources 15 as well as player information from host computer 11. Sub-computer 12 performs overall management of the game data in lane L, including automatic processing of game scores as well as such things as displaying cheering characters when a player gets a strike or a spare. Sub-computers 12 are preferably installed together at a place that is not visible to the players.

An over-head monitor 13 is installed in front of and above a waiting space S where players wait during a game. Over-head monitor 13 comprises a picture tube that displays game information received from sub-computer 12 and the like. The players sit in the seats installed in waiting space S and can watch the game information displayed on over-head monitor 13.

A plurality of over-head monitors 13 are installed, corresponding to lanes L. Each over-head monitor 13 has a width that is roughly the same as the width of lane L, whereby over-head monitors 13 are disposed continuously across lanes L with very little, or no empty space between adjacent over-head monitors 13. In the perspective view of FIG. 1, over-head monitors appear to be wider than lanes L, but this is due to the closeness to the viewer.

Masking monitors 14 are disposed continuously across lanes L in front of pin setting machines (not shown in the drawing) installed at the front of lanes L. Each masking monitor 14 has a width that is roughly the same as the width of lane L. Masking monitors 14 serve to hide the pin setting machine from the players.

Figure 3:
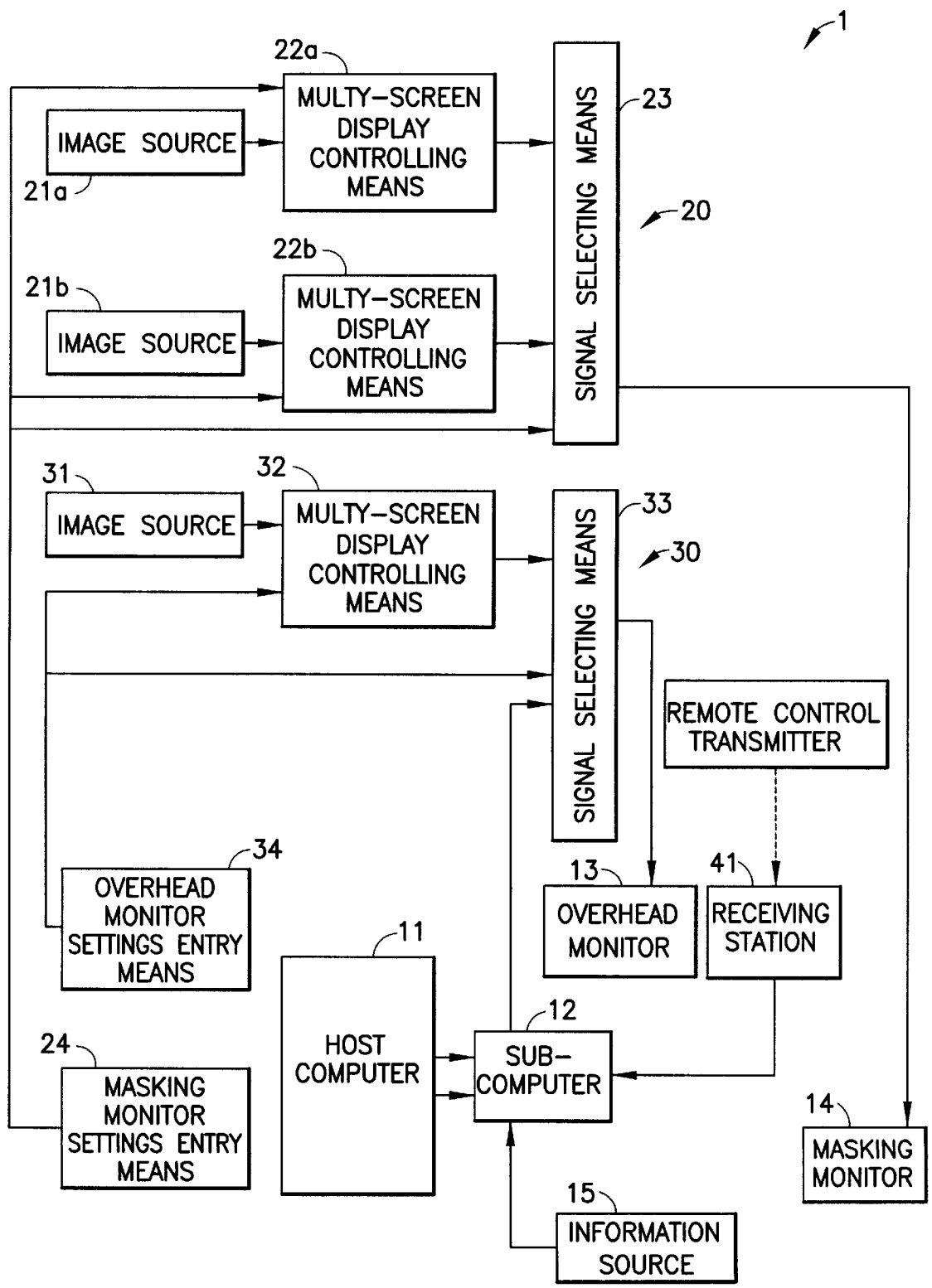
FIG. 3 is a block diagram showing the basic structure of the image display system for the bowling lane in FIG. 1.
Figure 4:
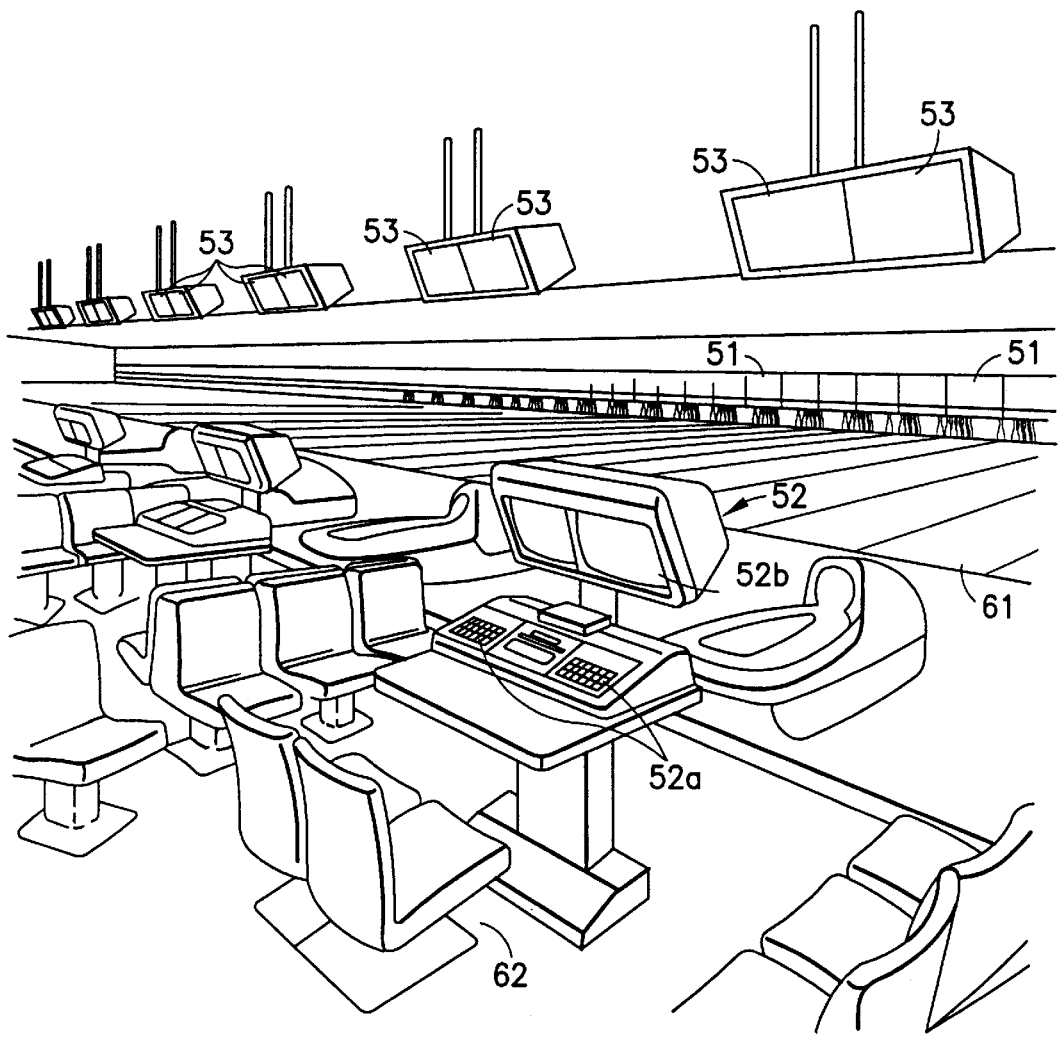
FIG. 4 is a perspective drawing showing a conventional bowling lane.

Referring to FIG. 3, there is shown a block diagram of the basic configuration of the image display system for bowling lanes. An image display system, shown generally at 1, includes: a masking monitor image display device 20 and an over-head monitor 13. Masking monitor image display device 20 displays images on respective masking monitors 14 to display images. An over-head monitor image display device 30 displays images on over-head monitors 13.

Masking monitor image display device 20 receives image signals from two image sources 21a, 21b, which may be, for example, T.V. broadcasts, video tape recorders, video discs, and the like. Masking monitor image display device 20 includes two multi-screen display controlling means 22a, 22b, which split up a single image onto the plurality of masking monitors 14, thus providing an enlarged display. The output signals from multi-screen display controlling means 22a, 22b are first sent to a signal selecting means 23. Signal selecting means 23 selects between the two signals from multi-screen display controlling means 22a, 22b, and sends the appropriate output signals to masking monitors 14.

Multi-screen display controlling means 22a, 22b and signal selecting means 23 are connected to a masking-monitor settings entry means 24 for providing settings for masking monitors 14. The masking monitor settings data entered via masking-monitor settings entry means 24 is sent to multi-screen display controlling means 22a, 22b and signal selecting means 23. Based on the settings data, multi-screen display controlling means 22a, 22b perform split-image processing. Signal selecting means 23 sends image signals to masking monitors 14.

Over-head monitor image display device 30 receives an image signal from an image source 31, for example, a T.V. broadcast, a video tape recorder, a video disc, or the like. Over-head monitor image display device 30 includes multi-screen display controlling means 32, which takes a single image and provides an enlarged and split-up display to the plurality of over-head monitors 13. The output signal from multi-screen display controlling means 32 is first sent to signal selecting means 33 along with a game information signal from sub-computer 12. Signal selecting means 33 selects between the output signals from multi-screen display controlling means 32 and sub-computer 12, and signals are output to appropriate over-head monitors 13.

Multi-screen display controlling means 32 and signal selecting means 33 are connected to an over-head monitor settings entry means 34. Over-head monitor settings entry means 34 provides settings for over-head monitor 13, which performs multi-screen displaying. The over-head monitor 13 settings data from over-head monitor settings entry means 34 is sent to multi-screen display controlling means 32 and signal selecting means 33. Based on this settings data, multi-screen display controlling means 32 performs image splitting. The settings data is also used by signal selecting means 33 to send the image signal from multi-screen display controlling means 32 to over-head monitor 13, while the game data signals from the sub-computers are sent to the other over-head monitors.

Receiving stations 41 are disposed near over-head monitors 13. Each receiving station 41 receives a wireless signal from remote control transmitter 42 to permit entry of changes. Receiving stations 41 are connected to sub-computers 12. Thus, if the player information (e.g. player names) entered at the front desk at the start of a game needs to be changed during the game, the players themselves can operate remote control transmitter 42 while looking at over-head monitor 13. This allows the players to easily enter changes.

The detailed structures of multi-screen display controlling means 22a, 22b and multi-screen display controlling means 32 are well known to those skilled in the art, and thus will not be described here. Known multi-frame displaying devices can be used, such as those described in Japanese Laid-Open Publication Number 2-243074 and Japanese Laid-Open Publication Number 5-145866.

The following is a description of the operation of image display system 1.

In this example, n units of masking monitors 14 are installed, with n lanes L. Either image source 21a or image source 21b and either multi-screen display controlling means 22a or 22b are used to take a single image and split it into n images to be displayed together on masking monitors 14.

In an alternative display configuration, image source 21 a and multi-screen display controlling means 22a to take the image from image source 21 a and split it into images for multi-screen displaying on the first through the kth masking monitors 14. Meanwhile, image source 21b and multi-screen display controlling means 22b can be used to take the image from image source 21b and split it into images for multi-screen displaying on the k+lth through the nth masking monitors 14 (i.e., the image would be displayed continuously on (n-k) monitors). Thus, when a plurality of adjacent lanes L are to be used for holding a bowling competition or the like, it is possible to display a message such as "XXth ANNUAL YYY BOWLING COMPETITION" on masking monitors 14 at the front of the lanes L being used in the competition. A single multi-screen image, such as a landscape, can be displayed on the masking monitors 14 at the front of the remaining lanes L.

In yet another display configuration, a single image can be displayed separately on each masking monitor 14. Or, a single image can be displayed as a multi-screen display across a series of masking monitors while the remaining masking monitors 14 display a single different image separately on each monitor.

Each of the display configurations can be used not only for static images but also for animation. For example, when a landscape image is being displayed, it is possible to display a dynamic landscape, such as the image of a wave breaking across a beach. With this configuration, it is possible to provide a superior decorative effect compared to conventional masking panels, where pictures or the like are permanently drawn.

Thus, with image display system 1 as described above, masking monitors 14 can be installed in place of conventional masking panels to display different images in various display configurations. This dramatically improves the decorative effect compared to the conventional technology, and provides more visual pleasure to the players.

Also, different images can be easily displayed simply by changing the image source. This makes it possible to change the contents of the display with less work than is involved in the conventional technology. The displays can be changed at short intervals so that players can be provided with fresh images all the time.

Furthermore, the use of masking monitor 14 makes it possible to provide timely displays of advertisements, messages from the bowling lane to the players, and the like. Thus, the masking portion at the front of lanes L can be utilized with maximum efficiency.

In image display system 1, selection of displays is performed by signal selecting means 33, which can select between images from image source 31 and various game information from sub-computer 12 such as score displays, displays of remaining pins, a player's bowling form display, and the like. Thus, various types of game information from sub-computer 12 can be sent to over-head monitors 13 at lanes L that are in use. Meanwhile, over-head monitors 13 for the remaining unused lanes L can provide a multi-screen display of an image such as a landscape. Alternatively, T.V. broadcasts can be shown separately on each monitor. This allows the over-head monitor 13 for the unused lanes L to be used efficiently.

Furthermore, in image display system 1, the players themselves can enter changes for player information and the like by using remote control transmitter 42 while watching over-head monitor 13. In the conventional technology, it is necessary to install in player waiting space S a sub-computer comprising: a keyboard for entry of changes; and an auxiliary display showing the same display as the over-head monitor. In the present invention, this is not necessary. The plurality of sub-computers 12 can be placed together somewhere out of sight from the players, thus conserving space and allowing the efficient use of player waiting space S.

In the embodiment described above, multi-screen displays are performed on masking monitor 14 and over-head monitor 13. However, it would also be possible to use over-head monitor 13 to display only game information from sub-computer 12 as in the conventional technology, while only masking monitor 14 displays the multi-screen display. It would also be possible to not use masking monitors 14, and use masking panels instead, as in the conventional technology. Multi-screen displays would only be shown on over-head monitors 13. It goes without saying that in such cases, either masking monitor image display device 20 or over-head monitor image display device 30 can be eliminated.

In the embodiment described above, image sources 21a, 21b and multi-screen display controlling means 22a, 22b simultaneously perform two types of multi-screen displaying on masking monitors 14. However, the present invention is not limited to this configuration. The present invention can also involve only one type of multi-screen display. In this case, only one image source and one multi-screen display controlling means is required, and signal selecting means 23 can be eliminated. Alternatively, a plurality of image sources 21a . . . 21n could be employed simultaneously to produce a plurality of image signals. The signal selecting means 23, via instructions from the masking monitor setting entry means 24, could then display a multitude of images or choose a few images from the many options created by the plurality of image sources. Furthermore, a plurality of image sources 31 could be employed as input for the overhead monitors. The same permutations of outputting many images or combinations of one image are possible just as in the explanation for the masking monitors, only now through the use of signal selecting means 33 via instructions from masking monitor settings entry means 24.

In the embodiment described above, game information and the like from sub-computer 12 is displayed on over-head monitor 13. However, the output signal from sub-computer 12 can also be sent to signal selecting means 23 in order to display the game information and the like on masking monitor 14. In this case, the receiving station of masking-monitor settings entry means 24 can be placed near masking monitor 14, and the players can enter changes while watching masking monitor 14.

In the embodiment described above, masking monitor 14 and over-head monitor 13 include picture tubes. However, it would also be possible to have masking monitor 14 and over-head monitor 13 include liquid crystal displays, active displays such as thin-film transistors, projection screens or any other display means.

In this embodiment, the signal from sub-computer 12 is sent directly to signal selecting means 33. However, it is also be possible to sent the signal from sub-computer 12 to signal selecting means 33 via multi-screen display controlling means 32. This makes it possible to use a plurality of over-head monitors 13 to show multi-screen displays of a player's bowling form or of characters and the like when a player makes a strike or a spare.

As described above, the image display system according to the present invention can perform multi-screen displaying of static and animated images from an image source onto a plurality of over-head monitors and masking monitors. The masking monitors are installed contiguously in front of the pin-setter machine at the front of the lanes. The over-head monitors are installed contiguously in front of and above the player waiting space. Thus, the decorative effect is improved dramatically compared to the conventional technology. Also, different images can be displayed simply by changing the image source. This decreases the amount of work required to change the display compared to the conventional technology. The displays can be changed at shorter intervals, and the player can always be provided with fresh images.

Also, the players themselves can make changes to player information and the like by operating the remote control transmitter while watching the over-head monitor. There is no need, as in the conventional technology, to install a sub-computer, comprising an auxiliary display showing the same display as the over-head monitor, in the player waiting space. Thus, the player waiting space can be used efficiently.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image display system for bowling lanes, each bowling lane having a respective pin-setting machine said display system comprising:
   a plurality of masking monitors disposed contiguously in front of respective pin setting machines, each of said masking monitors receiving a monitor image signal;
   a plurality of image sources producing a plurality of image signals;
   a plurality of means for controlling multi-screen displays
   each said means for controlling receiving an image signal from a respective image source;
   each said means for controlling including means for splitting up and displaying said image signals to said plurality of masking monitors in response to a first control signal;
   means for selecting at least one of said image signals;
   said means for selecting selectively coupling at least one of said display image signals from said corresponding means for controlling to said plurality of masking monitors in response to a second control signal;
   means for entering masking monitor settings;
   same means for entering producing said first control signal and said second control signal such that said control signals are coupled to said means for selecting at least one of said image signals and also coupled to said plurality of means for controlling multi-screen displays.

2. An image display system for bowling lanes comprising:
   a plurality of image sources producing a plurality of image signals;
   a plurality of over-head monitors disposed contiguously across, in front of, and above said lanes;
   a plurality of sub-computers, one for each of said lanes, for displaying information on a respective over-head monitor;
   each said sub-computer is located outside of a player waiting area of said respective bowling lane whereby an efficient use of space in said player waiting area is provided for without the use of a conventional auxiliary display in said waiting area;
   a first plurality of means for controlling multi-screen displays;
   each said first plurality of means for controlling receiving a respective image signal from a respective image source;
   each said first plurality of means for controlling including means for splitting up and displaying said respective image signal to said plurality of over-head monitors;
   means for entering over-head monitor settings coupled to said first plurality of means for controlling multi-screen displays, and further coupled to a first means for selecting signals;
   said first means for selecting signals selecting between an output signal from said sub-computer and output signals from said first plurality of means for controlling multi-screen displays, said selection based on an output signal from said means for entering over-head monitor settings; and
   said first means for selecting signals coupled to said plurality of over-head monitors, said first plurality of means for controlling multi-screen displays, and said plurality of sub-computers.

3. An image display system for bowling lanes as claimed in claim 2, further comprising:
   each bowling lane having a respective pin-setting machine;
   a plurality of masking monitors disposed contiguously between ends of said bowling lanes in front of said respective pin setting machine;
   a second plurality of means for controlling multi-screen displays;
   each of said second plurality of means for controlling receiving a respective image signal from a respective image source;
   each of said second plurality of means for controlling including means for splitting up and displaying said respective image signal to said plurality of masking monitors;

second means for selecting at least one of said image signals coupled to said second plurality of means for controlling multi-screen displays and further coupled to said plurality of masking monitors; and means for entering masking monitor settings coupled to said second means for selecting and said second plurality of means for controlling.

4. An image display system for bowling lanes as claimed in claim 2 further comprising:

a host computer; and a plurality of game information sources where said plurality of sub-computers each receive player information signals sent from said host computer and game information signals sent from said plurality of game information sources; and said plurality of sub-computers further display player information and various game information on a respective over-head monitor at a corresponding lane.

5. An image display system for bowling lanes as claimed in claim 2 further comprising:

a plurality of transmitters and a plurality of receiving stations, each corresponding to a respective transmitter;

said receiving stations each coupled to a respective sub-computer;

whereby a user could input information into a transmitter which will be relayed to said sub-computer.

6. An image display system for bowling lanes, each bowling lane having a respective pin-setting machine, said display system comprising:

a plurality of masking monitors disposed contiguously in front of said respective pin setting machines;

each of said masking monitors having a monitor image input;

each of said masking monitors producing a masking monitor image in response to said monitor image input;

a first multi-screen display control means receiving a first input image from a first image source;

said first multi-screen display control means producing a first and second output image in response to a first display control input;

a second multi-screen display control means receiving a second input image from a second image source;

said second multi-screen display control means producing a third output image in response to a second display control input;

a signal selecting means receiving said first, second and third output images;

said signal selecting means selectively coupling selected images from said first, second and third and output images to said monitor image inputs, said selected images corresponding to said selection control input;

means for entering masking monitor settings;

said means for entering masking monitor settings producing said selection control input, said first control input and said second control input;

a first making monitor being one of said plurality of masking monitors;

a second masking monitor being another of said plurality of masking monitors;

said first output image is selectively coupled to said monitor image input of said first masking monitor;

said second output image is selectively coupled to said monitor image input of said second masking monitor;

said first output image corresponding to a portion of said first input image;

said second output image corresponding to another portion of said first input image; and said first and second masking monitors are adjacent one another such that said first input image is selectively displayed across said first and second masking monitors.

7. An image display system for bowling lanes, each bowling lane having a respective pin-setting machine at a pin an end of said bowling lane, each bowling lane also having a player waiting area at another end of said bowling lane, said display system comprising:

a plurality of masking monitors disposed contiguously in front of said respective pin setting machines at said pin end of said bowling lanes;

each of said masking monitors having a monitor image input;

each of said masking monitors producing a masking monitor image in response to said monitor image input;

a first multi-screen display control means receiving a first input image from a first image source;

said first multi-screen display control means producing at least two output images in response to a first display control input;

a first signal selecting means receiving said at least two output images;

said first signal selecting means selectively coupling selected images from said at least two output images to said monitor image inputs, said selected images corresponding to said first selection control input;

means for entering masking monitor settings;

said means for entering masking monitor settings producing said first selection control input and said first display control input;

at least two of said plurality of masking monitors are located adjacent one another;

each of said at least two output images corresponds to a different portion of said first input image;

said at least two output images are selectively coupled to respective ones of said at least two of said plurality of masking monitors whereby said first input image is selectively displayed across said at least two of said plurality of masking monitors, each of said at least two of said plurality of masking monitors displaying a different portion of said first input image;

a plurality of over-head monitors;

said plurality of over-head monitors are disposed contiguously above said bowling lanes at said player waiting area end of said bowling lanes such that each said bowling lane has at least one respective over-head monitor above said respective player waiting area;

each of said over-head monitors having an over-head monitor image input;

each of said over-head monitors producing an over-head monitor image in response to said over-head monitor image input;

each said bowling lane having a sub-computer producing display information for said at least one respective over-head monitor;

each said sub-computer is located outside of said player waiting area of said respective bowling lane whereby an efficient use of space in said player waiting area is provided for without the use of a conventional auxiliary display in said waiting area;

a second multi-screen display control means receiving a second input image from a second image source;

said second multi-screen display control means including means for splitting up and displaying said second input image to said plurality of over-head monitors;

said second multi-screen display control means producing at least two overhead images in response to a second display control input;

a second signal selecting means receiving each said display information for said at least one respective over-head monitor, and also receiving said at least two over-head images;

said second signal selecting means selectively coupling selected images from said display information for said at least one respective over-head monitor, and said at least two over-head images to said over-head monitor image inputs, said selected images corresponding to said second selection control input;

means for entering over-head monitor settings; and said means for entering over-head monitor settings producing said second selection control input and said second display control input.

8. An image display system for bowling lanes, as in claim 7, wherein said display information includes at least one of a bowling score, a number of remaining pins, a player's bowling form, a graphical image, an animated image and a television broadcast.

9. An image display system for bowling lanes, as in claim 7, wherein:

said first signal selecting means also receiving said display information from said sub-computer; and said first signal selecting means also selectively coupling said display information from said sub-computer to said monitor image inputs, said selected images corresponding to said first selection control input.

10. An image display system for bowling lanes, as in claim 9, wherein said display information includes at least one of a bowling score, a number of remaining pins, a player's bowling form, a graphical image, an animated image and a television broadcast.

11. An image display system for bowling lanes, as in claim 7, wherein said first signal selecting means and said second signal selecting means are part of a single signal selecting means.

12. An image display system for bowling lanes, as in claim 11, wherein said display information includes at least one of a bowling score, a number of remaining pins, a player's bowling form, a graphical image, an animated image and a television broadcast.

13. An image display system for bowling lanes, as in claim 12, wherein:

said first signal selecting means also receiving said display information from said sub-computer; and said first signal selecting means also selectively coupling said display information from said sub-computer to said monitor image inputs, said selected images corresponding to said first selection control input.

14. An image display system for bowling lanes, as in claim 7, wherein said means for entering over-head monitor settings; and said means for entering masking monitor settings are part of a single settings entry means.

15. An image display system for bowling lanes, as in claim 14, wherein said first signal selecting means and said second signal selecting means are part of a single signal selecting means.

16. An image display system for bowling lanes, as in claim 15, wherein said display information includes at least one of a bowling score, a number of remaining pins, a player's bowling form, a graphical image, an animated image and a television broadcast.

17. An image display system for bowling lanes, as in claim 16, wherein:

said first signal selecting means also receiving said display information from said sub-computer; and said first signal selecting means also selectively coupling said display information from said sub-computer to said monitor image inputs, said selected images corresponding to said first selection control input.

18. An image display system for bowling lanes, as in claim 17, further comprising:

a plurality of transmitters and a plurality of receiving stations, each corresponding to a respective transmitter;

said plurality of receiving stations are located outside of said player waiting area;

said receiving stations each coupled to a respective sub-computer;

whereby a user could input information into a transmitter which will be relayed to said sub-computer.

19. An image display system for bowling lanes, as in claim 18, further comprising:

a host computer; and a plurality of game information sources where said plurality of sub-computers each receive player information signals sent from said host computer and game information signals sent from said plurality of game information sources; and said plurality of sub-computers further display player information and various game information on a respective over-head monitor at a corresponding lane.

* * * * *